Nov. 7, 1950     J. A. LOGAN ET AL     2,528,697
HOSE NOZZLE OF THE AUTOMATIC SHUTOFF TYPE
Filed April 8, 1948     3 Sheets-Sheet 1
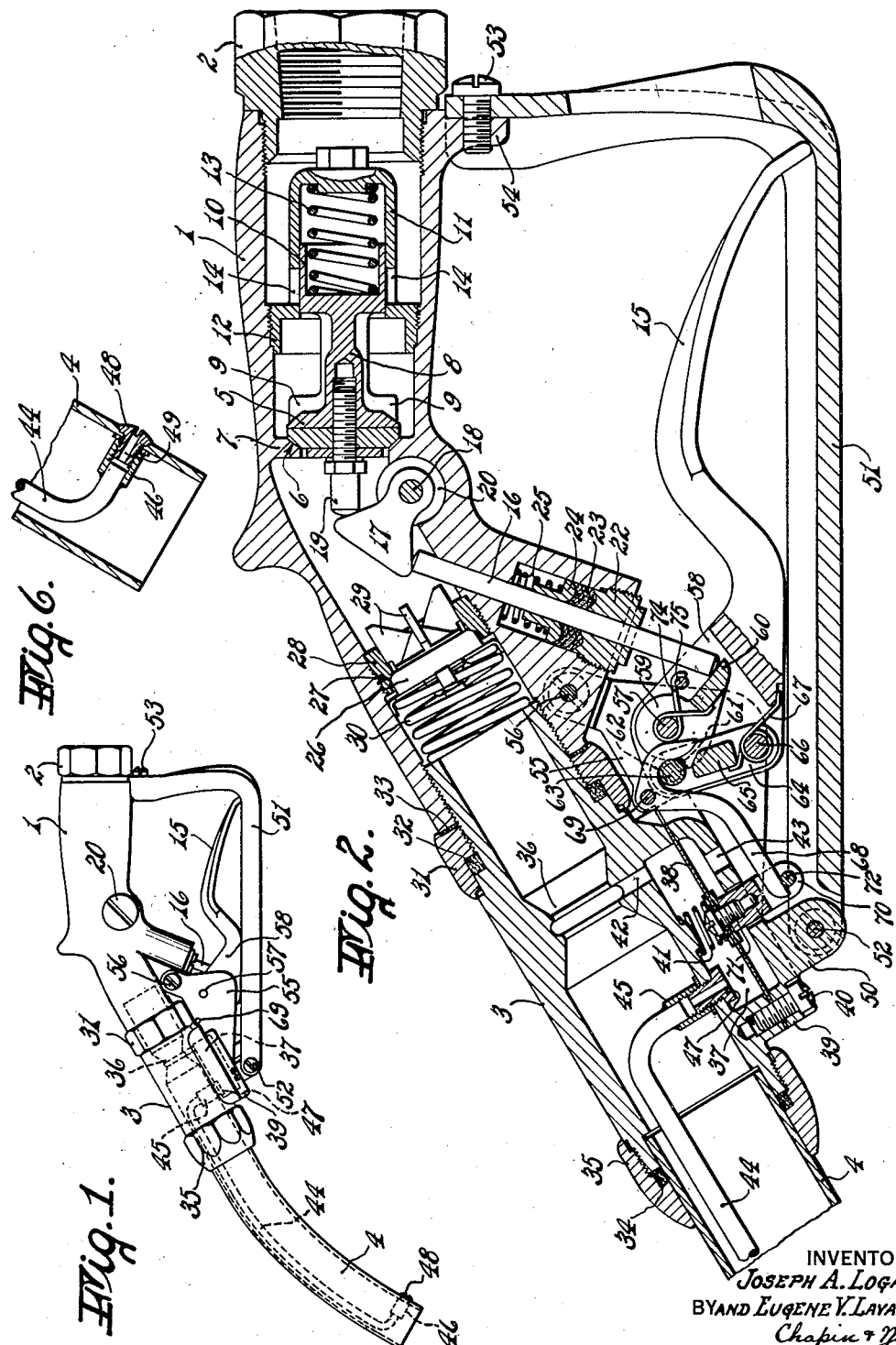
INVENTORS
JOSEPH A. LOGAN
AND EUGENE V. LAVALLEE
BY Chapin & Neal
ATTORNEYS

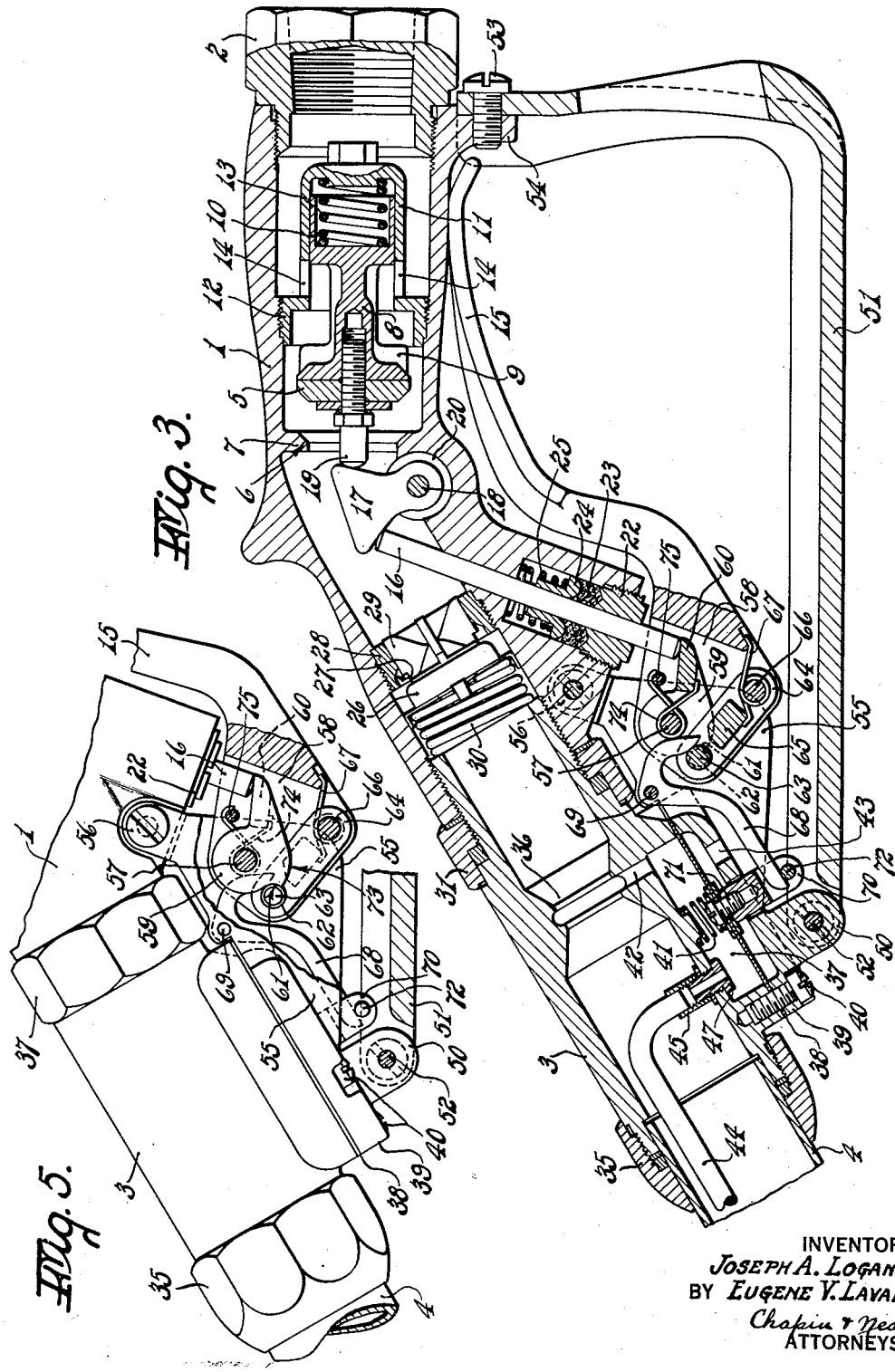

Nov. 7, 1950 J. A. LOGAN ET AL 2,528,697
HOSE NOZZLE OF THE AUTOMATIC SHUTOFF TYPE
Filed April 8, 1948 3 Sheets-Sheet 3
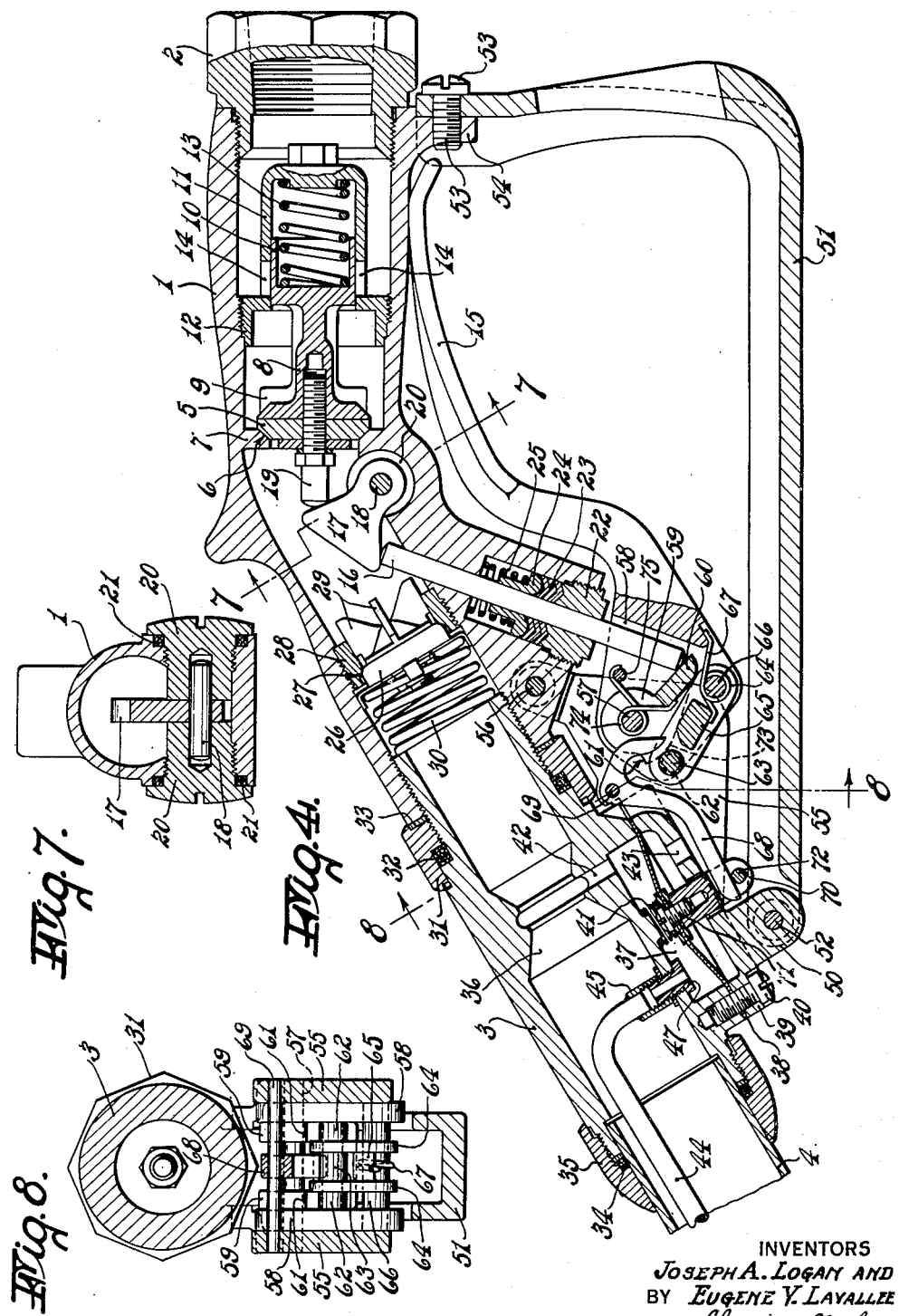
INVENTORS
JOSEPH A. LOGAN AND
BY EUGENE V. LAVALLEE
Chapin & Neal
ATTORNEYS Patented Nov. 7, 1950

2,528,697

UNITED STATES PATENT OFFICE 2,528,697

HOSE NOZZLE OF THE AUTOMATIC SHUTOFF TYPE

Joseph A. Logan, Hadley, and Eugene V. Lavallee, South Hadley, Mass., assignors to Gilbert & Barker Manufacturing Company, West Springfield, Mass., a corporation of Massachusetts Application April 8, 1948, Serial No. 19,734

7 Claims. (Cl. 226—127)

This invention relates to an improved hose nozzle, of the kind commonly used at gasoline service stations for filling the tanks of automobiles and having a spring-closed control valve which may be opened and held open by manual pressure on a hand lever.

The invention has for an object the provision of an improved mechanism enabling the nozzle control valve to be automatically closed by its spring, whenever the liquid in the tank, being serviced, reaches a predetermined point on the spout of the hose nozzle, even though manual pressure is maintained on the hand lever to retain it in the position to which it was moved to open the valve.

The improved automatic shut-off mechanism of this invention is characterized by high sensitivity to make it responsive even to very low rates of flow and by reliability in operation.

The improvements will best be understood in connection with the description of one illustrative example of the invention in the accompanying drawings, in which:

Fig. 1 is an exterior side elevational view of a hose nozzle embodying the invention;

Fig. 2 is a fragmentary sectional elevational view thereof, drawn to a larger scale and showing the valve actuating mechanism with the parts in their normal rest positions with the nozzle valve closed;

Fig. 3 is a view similar to Fig. 2 but showing the parts of the valve actuating mechanism in the positions which they assume when the nozzle valve is held open by manual pressure on the handle lever;

Fig. 4 is a view similar to Fig. 3 but showing the parts as they are after the nozzle valve has been closed by the automatic shut-off mechanism while manual pressure on the handle lever has been maintained;

Fig. 5 is a fragmentary exterior elevational view with parts broken away to show one of the latching rolls and shoulders of the automatic safety shut-off mechanism;

Fig. 6 is a fragmentary sectional view of the connection of the vent tube to the nozzle spout near its delivery end; and Figs. 7 and 8 are sectional views taken on the lines 7—7 and 8—8 respectively of Fig. 4.

Referring to these drawings; the complete hose nozzle is shown in Fig. 1. It includes a hollow body 1, having a bushing 2 at one end, adapted for attachment to the hose of a gasoline dispensing pump; a hollow casing 3, fixed to the body 1 as an extension thereof; and a tubular delivery spout 4, held to the casing 3 as an extension thereof and adapted for insertion into the fill pipe of the tank to be serviced. The bushing, body, casing and spout afford through them a passage for the flow of gasoline from the gasoline hose to the tank to be serviced.

Within the body 1 (Fig. 2) is a control valve 5, movable toward and away from a seat 6, which is formed in a transverse partition wall 7 of the body 1, to control the flow through the opening in such partition. The valve 5 has a rearwardly extending stem 8, formed with a plurality of radial vanes 9 spaced circumferentially around the valve, which slidably engage the peripheral wall of a straight cylindrical portion of the passage in body 1 and guide it for sliding movement in a direction axially toward and away from its seat. The rear end of stem 8 has thereon a hollow piston 10, which is slidably mounted in a cylinder 11, formed on a bushing 12, threaded into the body 1 and located to the rear of valve 5 in the gasoline passage and in coaxial relation with the valve. A spring 13, within the cylinder 11, acts between the closed end of the cylinder 11 and the piston 10 to hold valve 5 on seat 6. In the peripheral wall of cylinder 11 are ports 14, which are controlled by piston 10, being closed by the latter when valve 5 is closed and being opened by the piston after the valve 5 has moved a short distance away from its seat. This piston helps to support valve 5 in its sliding movement and also cooperates with it as an auxiliary valve in controlling the flow through the nozzle, and in relieving the valve 5 of some of the hydraulic pressure that tends to move it toward its seat.

The control valve 5 is adapted to be opened against the force of spring 13 by means of a hand lever 15, acting through the intermediary of a cylindrical stem 16 which is mounted to slide in body 1 at an obtuse angle to the axis of stem 8 of valve 5 and has its inner end located in the nozzle passage on the discharge side of partition 7. The inner end of stem 16 engages one side of a lever 17, mounted on a pivot rod 18, and the other side of the lever 17 engages an abutment 19, threaded into valve 5. As shown in Fig. 7, the lever 17 is mounted between the inner end faces of two studs 20, which are threaded into the body 1 from opposite sides and sealed by packing 21. The pivot rod 18 has its ends positioned, one in each of two holes formed in and coaxially of the studs 20. The stem 16 slides through a suitable stuffing box, which is mounted in a recess in body 1, closed by a bushing 22, and which comprises packing 23, a gland 24 and a spring 25 for pressing the gland against the packing.

A check valve is shown at 26, slidably mounted for movement axially of the nozzle passage in body 1 and near the discharge end thereof. Valve 26 cooperates with a seat 27 on a bushing 28 threaded into the nozzle passage and has radial guide vanes 29 engaging the opening in the bushing to guide the valve. The check valve is held closed by a spring 30 acting between one end of casing 3 and the valve.

The casing 3 is exteriorly threaded at one end to screw into the discharge end of the nozzle passage in body 1. Threaded on said end of the casing 3 is a lock nut 31, which has a packing ring 32 compressed between it and the casing. After the casing 3 has been threaded into the body 1 as far as possible, the casing may have to be moved back by part of a turn to get the casing in the proper radial location relative to body 1. After the casing 3 has been thus turned back, the lock nut can be turned up tightly, clamping the interposed gasket 33 between it and the adjacent end face of the body 1 to lock the casing in position. The packing 32 allows the lock nut to be turned back far enough for the described purpose without creating a leak.

The delivery spout 4 has its inner end slipped into a counterbore in the discharge end of the passage in casing 3. A packing ring 34 is compressed against the peripheral wall of the spout by a gland nut 35 to frictionally hold spout 4 in place and form a leak proof joint.

The casing 3 contains the suction means which is utilized, as will later appear, to initiate the automatic release of the restraint upon the nozzle control valve 5, enabling it to automatically close and avoid overflowing the tank being serviced. The passage in casing 3, through which gasoline flows, is formed with a venturi 36. Also formed in casing 3 is a depending cylindrical chamber 37, closed at its outer end by a flexible diaphragm 38, clamped at its marginal portion between the end face of the peripheral wall of the chamber and a cap 39—the latter being held in place by a plurality of screws 40. A spring 41 tends to hold the diaphragm in the position illustrated in Figs. 2 and 3. A passage 42 in casing 3 connects the throat of venturi 36 to chamber 37, whereby air may be drawn out of this chamber to create a partial vacuum therein and cause the diaphragm 38 to be moved inwardly by atmospheric pressure (see Fig. 4)—a hole 43 being provided in cap 39 to enable air to flow freely into and out of the space between the cap and diaphragm. The chamber 37 is normally vented to the atmosphere. The venting is effected by a tube 44 (Fig. 1); couplings 45 and 46, one on each end of the tube; and hollow screws 47 and 48, which respectively thread into the couplings 45 and 46. The tube 44 has its inner end bent at right angles so that one end face of coupling 45 (see Fig. 2) abuts a portion of the wall of the gasoline passage in casing 3. The hollow screw 47 passes through the inner wall of chamber 37 and serves both to clamp the coupling 45 in place and to connect the chamber 37 to the tube 44. The other end of tube 44 (Fig. 6) is connected to a lower portion of the peripheral wall of the spout by the screw 48 and coupling 46 in a similar manner. It will be seen that chamber 37 will be vented to the atmosphere until the hole 49 through screw 48 is closed by the gasoline rising in the tank being serviced. Then, the suction through passage 42 will be enabled to create a partial vacuum in chamber 37 and cause inward movement of diaphragm 38 and the release of the automatic, safety, valve-closing means to be later described.

The cap 39 (Fig. 2) is provided with laterally-spaced outwardly-projecting ears 50, between which one end of a guard 51 for lever 15 is secured, as by a screw 52. This guard is substantially right-angular in shape and has its other end secured by a screw 53 to a downwardly projecting lug 54 on the body 1. The cap 39 (Fig. 5) also has connected integrally therewith at one end two spaced parallel webs 55, which at their other ends are held to the nozzle body 1 by screws 56 (see also Fig. 1).

The hand lever 15 (Fig. 2) is loosely mounted near one end on a fulcrum pin 57, which spans the two spaced webs 55 and is suitably fixed at its ends one in each web. That portion of lever 15 near its fulcrum is forked, forming two laterally-spaced parallel sides 58. The outer faces of these sides 58 lie contiguous to the inner faces of the webs 55 (Fig. 8). Loosely mounted on fulcrum pin 57 and located between the sides 58 of the fork of the hand lever 15, is a second lever or rocker arm which is made up of the parts 59 and 60 and through which the hand lever actuates the described stem 16 to open the control valve 5. This second lever has two laterally spaced sides 59, the outer faces of which lie contiguous with the inner faces of the sides 58, and a cross bar 60, which connects the free ends of the sides 59 and engages the lower end of stem 16. Each side 59 has in its periphery a shoulder 61, preferably of quadrantal form. These shoulders 61 are adapted to be engaged, one by each of a pair of rolls 62, rotatably mounted on the ends of a pin 63. This pin is fixed to a latch-link, which comprises two side plates 64, integrally connected by a cross piece 65. The latch-link is fulcrumed on a pin 66, fixed at its ends in and extending between the sides 58 of hand lever 15. The outer face of each side plate 64 lies contiguous with the inner face of each side 59 and the ends of pin 63 project beyond each plate 64 to receive the rolls 62 which extend close to the sides 58 so as to lie in the path of the shoulders 61 on the sides 59. A spring 67, coiled around pin 66, has one end engaging lever 15 and the other end engaging the cross bar 65 with a tendency to swing the latch-link 64, 65, clockwise and press the rolls 62 against the peripheral surfaces of the sides 59. When the hand lever 15 is drawn upwardly toward the nozzle body 1, it moves the lever 59, 60, by means of the latch-link 64, 65. A plane connecting the axis of pin 66 and the common axis of rolls 62 will lie just slightly to the right of the outer ends of shoulders 61 so that the latch-link 64, 65 is effective to move lever 59, 60, counterclockwise and lift stem 16 to open the control valve 5. The parts will then be in the position of Fig. 3.

To release the restraint upon valve 5 and enable it to be closed by its spring 13 in the event that the tank being serviced becomes filled, the link 64, 65, is swung on its pivot 66 counterclockwise far enough to enable the lever 59, 60, to be moved clockwise by the valve spring 13. For this purpose, a lever 68 is provided to be actuated by the suction means described. The lever 68 is fulcrumed on a pin 69, fixed at its ends one in each of the two webs 55. This lever has a short arm, which extends downwardly and to the right of pin 63 and between the two side plates 64 of the link (Fig. 8). The other arm of lever 68 (Fig. 2) is substantially longer and its free end lies between the arms of a fork 70, which is secured to the central portion of the flexible diaphragm 38 by a screw 71. A pin 72, fixed at its ends in the two arms of fork 70 and spanning the space therebetween, will engage lever 68 and swing it clockwise, when the diaphragm 38 is drawn inwardly by the suction effect in chamber 37, after the vent to this chamber has been closed by the rising liquid in the tank to be serviced. The force due to the suction means is multiplied by lever 68 to move the rolls 62 to the left from the position of Fig. 3 to that of Fig. 4 and in such movement release the lever 59, 60 for the valve closing movement. It will be noted that the lever 68 does not move far enough to move the rolls 62 entirely off the shoulders 61. It merely needs to move them far enough to carry the aforesaid plane which extends through the axes of pin 67 and rolls 62, to the left of the outer ends of the shoulders 61. As soon as this occurs, the powerful spring 13 acting on lever 59, 60, will swing it clockwise, and cam the rolls 62 entirely off the shoulders 61, as shown in Fig. 3, and allow the rolls to ride on the curved surfaces 73 of webs 59. Thus, the valve 5 may be automatically closed, while the hand lever 15 is manually held in the position to which it was moved to open the valve as in Fig. 4.

For restoring the lever 59, 60 to its normal position with relation to hand lever 15, so that the rolls 62 of link 64, 65, are positioned to engage shoulders 61 and enable the lever 59, 60, to be subsequently moved counterclockwise to open valve 5, a restoring spring 74 is provided. This spring 74 is coiled around the fulcrum pin 57 and has one end hooked around a pin 75, which is fixed at its ends to and spans the space between the sides 58 of hand lever 15, and the other end hooked around the cross piece 60. This spring 74 tends to swing the lever 15 and lever 59, 60, into the relation shown in Fig. 2 so that the rolls 62 on the latch-link 64, 65, can move off the surfaces 73 (Fig. 5) of the sides 59 and behind the shoulders 61 in position to engage the latter and move lever 59, 60, when the hand lever 15 is again moved to open valve 5. This occurs when the vacuum holding diaphragm 38 is broken as by taking the nozzle spout out of the fill pipe of a car.

The operation of the invention will next be described. The normal inactive positions of the parts are shown in Fig 2,—the control valve 5, its auxiliary valve 10 and check valve 26 being closed. The operator lifts the nozzle by the handle portion, afforded by the right hand portion of body 1, carries it to the tank to be serviced and inserts the delivery spout 4 into the tank. Then, the operator inserts his fingers beneath lever 15 and pulls the latter upwardly into the positon shown in Fig. 3. The hand lever 15, acting through latch link 64, 65, pulls rolls 62 against the shoulders 61 on the lever 59, 60, and swings the latter counterclockwise, lifting stem 16 and rocking lever 17 clockwise to push abutment 19 and open valves 5 and 10. Liquid under pressure will now flow past these valves, opening check valve 26, and into and through venturi 36, and then through spout 4 into the tank to be serviced. The parts are now in the positions shown in Fig. 3. The rush of liquid through the venturi draws air through passage 42 from chamber 37 but, since the outer end 49 of the vent (in screw 48) is open, air flows through tube 44 into chamber 37 to replace that drawn out through passage 42 and the diaphragm 38 will not be moved enough to effect the release of the lever 59, 60, from the rolls 62 of the latch link 64, 65. As soon, however, as the tank being serviced, is filled enough to cover the described inlet 49 (Fig. 6) to the vent for chamber 37, air will be exhausted from the latter and the diaphragm 38 will be drawn inwardly, thus causing the release lever 68 to swing clockwise. The latter, acting on pin 63, will move it far enough to move the rolls 62 outwardly on the shoulders 61 until the lever 59, 60, impelled by the powerful spring 13, will cam the rolls 62 completely off the shoulders. The lever 59, 60, will thus be moved clockwise by the valve spring 13 until valves 5 and 10 close. The check valve 26 will then close. Flow to the tank will then cease. The operator will withdraw the nozzle from the tank whereupon air will flow into chamber 37 to restore the diaphragm 38 to normal position. The operator, as he withdraws the nozzle, will release his grip on hand lever 15, whereupon the restoring spring 74, assisted by the action of gravity on hand lever 15, will swing the latter clockwise into the normal rest position shown in Fig. 2. The latch-link 64, 65, will be moved clockwise far enough for the rolls 62 to ride off the surfaces 73 (Fig. 4) and be moved inwardly by spring 67 in back of the shoulders 61. The pin 63 will move lever 68 counterclockwise into the position shown in Fig. 2,—the pin 72 having been previously moved outwardly by spring 41 out of restraining position. The parts are now in their normal positions shown in Fig. 2, ready for subsequent actions similar to that described.

The particular embodiment of the invention herein disclosed is useful in that it enables the conversion of existing valved hose nozzles in the field to supply them with the automatic shut-off feature. It will be noted that the casing 3 and its cap 39, with the spaced parallel webs 55 thereon, form a unit, supporting all the essential parts of the safety shut-off mechanism. This unit may be sold separately for attachment to ordinary hose nozzles. The ordinary form of hose nozzle has a body casing like the casing 1 of Fig. 1 and a spout similar to spout 4, attached directly to the outlet end of the body casing without the intermediary of any casing such as 3. The ordinary form of nozzle also has a guard, which is attached at its ends to the casing by screws located where the screws 53 and 56 are located in Fig. 1. The hand lever of the ordinary form of nozzle is pivoted to the guard and a portion of it directly engages the stem 16. To convert a nozzle of this kind, its spout, guard and valve lever are removed from the body casing. Then the conversion unit made up of the casing 3, the spout 4 and associated valve actuating mechanism parts, is connected to the outlet of the body casing, with the rocker arm 60 engaging stem 16. The new guard 51 is then applied and the conversion is complete.

Considering the conversion in more detail, the casing 3 will be screwed into the outlet end of casing 1 after the cap 39 and associated parts has been removed. With the coupling nut 31 turned rearwardly as far as possible, the casing 3 is screwed into the casing 1 as far as possible. Then, if the casing 3 is not in the correct radial position relatively to casing 1, the casing 3 will be turned backwardly by part of a turn until it comes into the proper radial position. Then, nut 31 will be turned up to clamp the gasket 33 between it and the end face of casing 1, locking casing 3 in position. The spring 41, diaphragm 38 and cap 39 are then put in place and held there by screws 40. The webs 55 are fastened by screws 56 to casing 1. Then the guard 51 is secured by screw 53 to casing 1 and by screw 52 to the lug 50 on cap 39.

The invention resides in the valve actuating mechanism and particularly the mechanism for releasing the restraint upon the nozzle valve and allowing it to close, when the tank being serviced is sufficiently filled and while the hand lever is held in the position to which it was moved in order to open the valve. It will be appreciated that the invention may be used with various kinds of valves in various kinds of hose nozzles. Consequently, the invention does not depend on the constructional details of the valves, the mountings of the valves and nozzle, herein shown. A single control valve, directly actuated by the lever 59, 60, in one direction and by a spring in the other direction may be used. The piston valve 10 and its cylinder 11, though desirable are not essential. And the auxiliary stem 16 and lever 17 are not essential to the invention, although desirable in a nozzle of the particular form herein shown. The check valve is optional, although it is frequently required in many localities and is generally desirable. So also the casing 3 need not necessarily be made separate from body 1, as shown, although that form is desirable as enabling the invention to be applied to hose nozzles in the field. The casing 3 can be interposed between the nozzle body 1 and the nozzle spout 4. The usual valve lever and its guard is removed and replaced by the lever 15 and associated parts and the guard 51.

The invention provides an improved automatic safety shut-off for the valves of hose nozzles, operable in the event that the tank being serviced becomes sufficiently filled, to release the restraint upon the theretofore open valve and allow it to close, while the hand lever is held in valve-open position.

We claim:

1. In a hose nozzle, having a tubular casing provided with a passage therethrough and a valve seat in said passage intermediate the inlet and outlet ends thereof, a valve for controlling the flow through said passage, a spring holding the valve to said seat, and an actuating stem for said valve having an end projecting outside said casing; manual means for moving said stem to open said valve, said means including a hand lever pivoted to said casing, a second lever pivoted to said casing and having a portion engageable with said stem and having also a latch shoulder, a latch-link pivotally connected at one end to said hand lever and having at a location spaced from such end a latch to engage said shoulder, a spring tending to hold the latch engaged with the shoulder, whereby the hand lever moves the second lever through the latch-link to move said stem and open said valve, and means operable by the rise of liquid in the outlet end of said passage to move said latch-link to release the latch from said shoulder and allow the second lever to be moved relatively to the first lever and the valve to be closed by the first-named spring.

2. In a hose nozzle, having a tubular casing provided with a passage therethrough and a valve seat in said passage, a valve for controlling the flow through said passage, a spring holding the valve to said seat, and an actuating stem for said valve having an end projecting outside said casing; manual means for moving said stem to open said valve, said means including a hand lever pivotally mounted at one end on said casing, a second lever also pivotally mounted at one end on said casing and having its other end engageable with the projecting end of said stem and having a latch shoulder, and a latch-link pivotally connected at one end to the hand lever and having at its other end a latch to engage said shoulder, whereby the hand lever moves the second lever by means of the latch-link to open said valve; means for releasing said latch from said shoulder to enable the second lever to move relatively to the hand lever and the valve to be closed by its spring, a restoring spring interconnecting said levers and operable when the hand lever is released to move it and the connected latch-link back into normal positions with relation to the second lever, and a restoring spring for said latch-link operable to move the latch into latching position when the first restoring spring moves it back past the shoulder.

3. In a hose nozzle, having a tubular casing provided with a passage therethrough and a valve seat in said passage, a valve for controlling the flow through said passage, a spring for holding the valve to said seat, and an actuating stem for said valve having an end projecting outside said casing; manual means for moving said stem to open said valve, said means including a first lever having a hand grip at one end and a fork at the other end, a fulcrum pin passing through the sides of the fork and pivotally supporting the lever from said casing, a second lever pivotally mounted at one end on said pin and having its other end engageable with the projecting end of said stem, the second lever located between the sides of the first lever and having a shoulder, a latch-link pivoted at one end to the first lever and having at its other end a latch to engage said shoulder and enable the first lever when manually moved to move the second lever through the engaged latch-link and shoulder to open said valve; a spring interconnecting said levers and tending to relatively hold them with the latch in line with the shoulder, and a spring interconnecting the first lever and latch-link and operable to move the latch into latching position with relation to the shoulder when the latch and link are moved into line, and means for releasing the latch from the shoulder, whereby the valve spring is enabled to move the second lever through said stem and close said valve, said first lever when the manual hold on it is released being moved backwardly by the first spring to carry the latch into line with the shoulder and the second spring being then operable to move the latch into latching position with relation to said shoulder.

4. In a hose nozzle, having a tubular casing provided with a passage therethrough and a valve seat in said passage, a valve for controlling the flow through said passage, a spring for holding the valve to said seat, and an actuating stem for said valve having an end projecting outside said casing; manual means for moving said stem to open said valve, said means including a first lever having a hand grip at one end and a fork at the other end, a fulcrum pin passing through the sides of the fork and pivotally supporting the lever from said casing, a second lever having a fork at one end and pivotally mounted at such end on said pin, said second lever having its other end engageable with the projecting end of said stem, the sides of the fork of the second lever being located between and contiguous one with each of the sides of the fork of the first lever, the peripheral portion of the sides of the second lever having shoulders, a latch-link having two spaced side plates located between and contiguous one with each of the sides of the fork of the second lever, said plates being pivoted at one end to the sides of the fork of the first lever, a pin mounted in and extending between said side plates an having ends projecting one beyond each side plate and engaged one with each of said shoulders; a release lever pivoted to said casing intermediate its ends and having one end extending between the side plates of the latch-link in position to engage the central part of said pin and move its ends on said shoulders far enough to release the second lever for movement relatively to the first lever and enable said valve to be closed by said spring, a restoring spring interconnecting said levers and operable when the hand lever is released to move it and the connected latch-link back into normal positions with relation to the second lever, and a restoring spring for said latch-link operable to move the latch into latching position when the first restoring spring moves it back past the shoulder.

5. In a hose nozzle, having a tubular casing provided with a passage therethrough and a valve seat in said passage, a valve for controlling the flow through said passage, a spring for holding the valve to said seat, and an actuating stem for said valve having an end projecting outside said casing; manual means for moving said stem to open said valve, said means including a first lever having a hand grip at one end and a fork at the other end, a fulcrum pin passing through the sides of said fork and pivotally supporting the lever from said casing, a second lever having a fork at one end pivotally mounted at such end on said pin, the other end of the second lever engageable with the projecting end of said stem, the sides of the fork of the second lever being located between and contiguous one with each of the sides of the fork of the first lever, the peripheral portion of the sides of the second lever having one on each quadrantal shoulders, a latch-link having two spaced side plates located between and contiguous one with each of the side portions of the fork of the second lever, said plates being pivoted at one end to the sides of the fork of the first lever, a pin fixed to the other end of said side plates and extending between and projecting beyond the same, rolls one on each of the projecting ends of said pin and engaged one with each of said shoulders, each said roll being held against axial movement between the adjacent side plate and the adjacent side of the fork of the first lever; a release lever pivoted to said casing intermediate its ends and having one end extending between the side plates of the latch-link in position to engage the central part of said pin and move said rolls on said shoulders far enough to release the second lever for movement relatively to the first lever and enable said valve to be closed by said spring, a restoring spring interconnecting said levers and operable when the first lever is released to move it and the connected latch-link back into normal positions with relation to the second lever, and a restoring spring for said latch-link operable to move the latch into latching position when the first restoring spring moves it back past the shoulder.

6. In a hose nozzle, having a tubular casing provided with a passage therethrough and a valve seat in said passage, a valve for controlling the flow through said passage, a spring for holding the valve to said seat, and an actuating stem for said valve having an end projecting outside said casing; manual means for moving said stem to open said valve, said means including a hand lever pivotally mounted at one end on said casing, a second lever also pivotally mounted at one end on said casing and having its other end engageable with the projecting end of said stem and having a latch shoulder, and a latch-link pivotally connected at one end to the hand lever and having at its other end a latch to engage said shoulder, whereby the hand lever moves the second lever by means of the latch-link to open said valve; said passage having a venturi therein on the discharge side of said valve, said casing having a chamber and a passage connecting it to the throat of said venturi, whereby the flow of liquid through said venturi will draw air out of said chamber, a flexible diaphragm forming a wall of said chamber, a vent conduit leading from the latter to said spout near its outlet end, whereby air will be admitted to said chamber until the inlet end of said conduit is submerged in liquid, whereupon suction will be created in said chamber, a lever pivoted intermediate its ends to said casing and having one end connected to be moved by said diaphragm when the latter is moved by suction created in said chamber, the other end of the last-named lever located to engage said latch on said movement of the diaphragm and release it from said shoulder to enable the second lever to move relatively to the hand lever and the valve to be closed by its spring, a restoring spring interconnecting said levers and operable when the hand lever is released to move it and the connected latch-link back into normal positions with relation to the second lever, and a restoring spring for said latch-link operable to move the latch into latching position when the first restoring spring moves it back past the shoulder.

7. A casing, having therethrough a passage including a venturi and having coupling means one on each end for connecting the casing between the body and spout of a valved hose nozzle, said casing also having a suction chamber, a passage connecting the latter to the throat of said venturi, and a vent passage, a flexible diaphragm forming one wall of said chamber and adapted to be moved inwardly from a normal position when suction exists in said chamber, a spring for normally holding the diaphragm in normal position, said casing having a pair of laterally spaced parallel webs, a fulcrum pin fixed at its ends one in each web and spanning the space between the webs, a hand lever forked at one end and loosely mounted at such end on said fulcrum pin, a second lever also forked at one end and loosely mounted at such end on said fulcrum pin and having the sides of its forked portion located between and contiguous one with each of the sides of the forked part of the first lever, the other end of the second lever adapted to engage and actuate the stem of the valve of the hose nozzle, said second lever having shoulders on the periphery of its said sides, a latch-link including laterally spaced side plates both located between and contiguous one with each of the sides of the second lever, said side plates being pivoted at one end to the sides of the first lever, a latch pin extending between the side plates and through and beyond the latter, the outer ends of said latch pin being engageable one with each of said shoulders, a release lever pivoted intermediate its ends to said webs and having one end connected to said diaphragm and the other end extending between said side plates in position to engage the central part of said latch pin and move the latter to carry its ends outwardly on said shoulders, a spring for holding the first and second levers in such position that the ends of said latch pin and said shoulder aline, and a spring connecting the side plates and first lever to move the ends of the latch pin into latching position with relation to said shoulders when the shoulders and said ends of the latch pin are alined.

JOSEPH A. LOGAN.
EUGENE V. LAVALLEE.

REFERENCES CITED

The following references are of record in the file of this patent:

UNITED STATES PATENTS

| Number | Name | Date |
|---|---|---|
| 1,550,738 | Payne | Aug. 25, 1925 |
| 1,998,221 | Conklin | Apr. 16, 1935 |
| 2,367,138 | Payne | Jan. 9, 1945 |